US012328798B2

(12) United States Patent
Wu

(10) Patent No.: US 12,328,798 B2
(45) **Date of Patent: *Jun. 10, 2025**

(54) ATOMIZER CAPABLE OF PREVENTING LIQUID LEAKAGE CAUSED BY AIR INSIDE A LIQUID RESERVOIR AND ELECTRONIC CIGARETTE WITH THE SAME

(71) Applicant: SHENZHEN SMOORE TECHNOLOGY LIMITED, Shenzhen (CN)

(72) Inventor: Zhenyu Wu, Guangdong (CN)

(73) Assignee: SHENZHEN SMOORE TECHNOLOGY LIMITED, Shenzhen (CN)

( * ) Notice: Subject to any disclaimer, the term of this patent is extended or adjusted under 35 U.S.C. 154(b) by 101 days.

This patent is subject to a terminal disclaimer.

(21) Appl. No.: 18/320,233

(22) Filed: May 19, 2023

(65) Prior Publication Data

US 2023/0292403 A1 Sep. 14, 2023

Related U.S. Application Data

(63) Continuation of application No. 17/033,798, filed on Sep. 27, 2020, now Pat. No. 11,665,785, and a (Continued)

(30) Foreign Application Priority Data

Jun. 6, 2017 (CN) ......................... 201720653314.0

(51) Int. Cl.

*H05B 1/02* (2006.01)
*A24F 40/42* (2020.01)

(Continued)

(52) U.S. Cl.

CPC ........... *H05B 1/0227* (2013.01); *A24F 40/42* (2020.01); *A24F 40/485* (2020.01); *H05B 3/03* (2013.01); *H05B 3/06* (2013.01); *A24F 40/10* (2020.01)

(58) Field of Classification Search

CPC ......... H05B 1/0227; H05B 3/06; A24F 40/42; A24F 40/40; A24F 40/485

See application file for complete search history.

(56) References Cited

U.S. PATENT DOCUMENTS 10,349,678 B2 7/2019 Chen
10,791,763 B2 * 10/2020 Chen .................... H05B 1/0227

(Continued)

FOREIGN PATENT DOCUMENTS

CN 204070577 U * 1/2015
CN 204317492 U 5/2015

(Continued)

OTHER PUBLICATIONS

Evaluation report of CN application No. 2017206533140 issued on May 7, 2021.

(Continued)

*Primary Examiner* — Hae Moon Hyeon
(74) *Attorney, Agent, or Firm* — Andrew C. Cheng

(57) ABSTRACT

The present disclosure provides an atomizer and an electronic cigarette with the atomizer. The atomizer includes a cartridge assembly and a mouthpiece assembly; the cartridge assembly includes a liquid reservoir, an opening communicating the liquid reservoir with an external environment, and an atomization chamber communicating with the liquid reservoir; the mouthpiece assembly is inserted into the opening; the cartridge assembly includes an engaging portion located adjacent to the opening, and the mouthpiece assembly includes an inserting portion inserted into the (Continued)

engaging portion; the inserting portion defines a discharging hole, air discharges through the discharging hole while the inserting portion is being inserted into the engaging portion, and after the inserting portion is inserted into the engaging portion in place, the discharging hole is blocked, thus, e-liquid in the liquid reservoir can be prevented from being pushed to flow into the atomization chamber and liquid leakage can be prevented.

17 Claims, 10 Drawing Sheets

Related U.S. Application Data continuation of application No. 15/953,603, filed on Apr. 16, 2018, now Pat. No. 10,791,763.

(51) Int. Cl.

| | |
|---|---|
| ***A24F 40/485*** | (2020.01) |
| ***H05B 3/03*** | (2006.01) |
| ***H05B 3/06*** | (2006.01) |
| *A24F 40/10* | (2020.01) |

(56) References Cited

U.S. PATENT DOCUMENTS 11,665,785 B2 * 5/2023 Wu ...................... H05B 1/0227 131/329
2016/0135505 A1 5/2016 Li et al.
2016/0157522 A1 6/2016 Zhu
2016/0192707 A1 7/2016 Li et al.
2018/0360126 A1 12/2018 Chen
2019/0124997 A1 5/2019 Qiu
2019/0254345 A1 8/2019 Hepworth et al.
2019/0373954 A1 12/2019 Rado
2020/0015524 A1 * 1/2020 Rado ....................... A24F 40/46
2022/0007716 A1 * 1/2022 Lin ......................... A24F 40/10

FOREIGN PATENT DOCUMENTS

CN 104939324 A 9/2015
CN 205005905 U * 2/2016
CN 205233458 U * 5/2016
CN 205813573 U 12/2016
CN 206119187 U 4/2017
CN 110051051 A * 7/2019 ............. A24F 40/10
GB 2531986 A 5/2016
WO 2016049876 A1 4/2016

OTHER PUBLICATIONS

Ex Parte Quayle Action of U.S. Appl. No. 15/953,603 issued on May 22, 2020.
The Grant Notification of CN application No. 201720653314.0 issued on Dec. 21, 2017.
Notice of Allowance of U.S. Appl. No. 15/953,603 issued on Jul. 27, 2020.
Notice of Allowance of U.S. Appl. No. 17/033,798 issued on Mar. 24, 2023.
Non-Final OA of U.S. Appl. No. 17/033,798 issued on Nov. 22, 2022.

* cited by examiner

ATOMIZER CAPABLE OF PREVENTING LIQUID LEAKAGE CAUSED BY AIR INSIDE A LIQUID RESERVOIR AND ELECTRONIC CIGARETTE WITH THE SAME

CROSS REFERENCE TO RELATED APPLICATIONS

This non-provisional patent application is a continuation application of a co-pending national application Ser. No. 17/033,798, filed on Sep. 27, 2020, which is a continuation application of a co-pending national application Ser. No. 15/953,603, filed on Apr. 16, 2018, all contents of which are incorporated herein by reference.

TECHNICAL FIELD

The present disclosure relates to substitutes for cigarettes, and more particularly, to an atomizer and an electronic cigarette with the same.

BACKGROUND

At present, electronic cigarettes have become mature substitutes for tobacco cigarettes. The electronic cigarette atomizes e-liquid in an atomizer by heating a heating element through a power supply, thereby providing harmless smoke. As a key component of the electronic cigarette, the atomizer plays an important role in the performance of the electronic cigarette.

At present, in some disposable electronic cigarettes, e-liquid is injected in to the electronic cigarette from a top of the atomizer after the assembly of an atomization core is finished, and then a mouthpiece assembly is mounted to the atomizer to seal a top of a liquid reservoir of the atomizer. However, during this process, a part of the mouthpiece assembly needs to extend into the liquid reservoir, that is, a part of the mouthpiece assembly may be moved into the liquid reservoir; since the mouthpiece assembly and the atomizer are air-tight, the movement of the mouthpiece assembly may compress the air inside the liquid reservoir and further push the e-liquid in the liquid reservoir to flow into the atomization core, thereby causing the leakage of the e-liquid.

SUMMARY OF THE DISCLOSURE

The present disclosure provides an atomizer which is capable of preventing liquid leakage caused by that air inside a liquid reservoir is compressed by a mouthpiece assembly to drive e-liquid inside the liquid reservoir to flow into an atomization core during the assembly of the mouthpiece assembly. The present disclosure further provides an electronic cigarette with the atomizer.

The atomizer applicable in an electronic cigarette includes a cartridge assembly, a mouthpiece assembly; the cartridge assembly includes a liquid reservoir, an opening communicating the liquid reservoir with an external environment, and an atomization chamber communicating with the liquid reservoir; the mouthpiece assembly is inserted into the opening; the cartridge assembly includes an engaging portion located adjacent to the opening, the mouthpiece assembly includes an inserting portion inserted into the engaging portion; the engaging portion defines a discharging hole for discharging air inside the liquid reservoir while the inserting portion is being inserted into the engaging portion, and after the inserting portion is inserted into the engaging portion in place, the discharging hole is blocked by the inserting portion.

In an embodiment, the inserting portion is detachably inserted into the engaging portion.

In an embodiment, the cartridge assembly includes a base, an air flowing tube assembly mounted on the base, a cartridge sleeved on the air flowing tube assembly; and the liquid reservoir is formed between an outer wall of the air flowing tube assembly and an inner wall of the cartridge;

the air flowing tube assembly includes an inner air flowing tube, and the discharging hole is defined in a top of a wall of the inner air flowing tube; and the inner air flowing tube forms the atomization chamber;

the mouthpiece assembly further includes a sealing member and an air outlet tube communicating with the inner air flowing tube; and the sealing member is inserted into the inserting portion for blocking the discharging hole.

In an embodiment, the inner air flowing tube includes a first tube section, a second tube section communicating with the mouthpiece assembly, and a step formed at the connection between the first tube section and the second tube section; and a diameter of the second tube section is less than that of the first tube section;

the discharging hole is defined in the second tube section and communicates with the second tube section; and the second tube section is inserted into the inserting portion, and the sealing member is sleeved on the second tube section and corresponds to the discharging hole.

In an embodiment, the air flowing tube assembly includes an outer air flowing tube sleeved on the inner air flowing tube;

- the outer air flowing tube includes a tube body and a cover located on one end of the tube body, and a through hole is defined in the cover;
- the tube body is sleeved on the first tube section, an inner surface of the tube body tightly contacts an outer surface of the first tube section, and the second tube section passes through the through hole; a bottom diameter of the tube body matches with that of the first tube section, and a top diameter of the tube body matches with that of the second tube section; and
- the liquid reservoir is formed between an outer surface of the tube body and an inner surface of the cartridge, and an airflow channel is formed between the inner surface of the tube body and the outer surface of the first tube section.

In an embodiment, the first tube section forms the atomization chamber, and an atomization assembly is arranged in the atomization assembly; and

- at least one liquid absorbing hole is defined in the first tube section and the outer air flowing tube, and the liquid absorbing hole defined in the outer air flowing tube corresponds to and communicate with the liquid absorbing hole defined in the first tube section.

In an embodiment, the base includes a plate, a mounting portion arranged on the plate and extending towards a top of the atomizer, and a connecting portion located on a bottom of the plate; and

- a first air inlet is formed in the connecting portion; the air flowing tube assembly and the cartridge are located on the mounting portion, and the cartridge is sleeved on the mounting portion;

In an embodiment, a first air intake slot and a second air intake slot are formed on the outer surface of the first tube section, the first air intake slot communicates with the first air inlet, and the second air intake slot faces away from the first air intake slot; a second air inlet communicating with the inner air flowing tube is formed in the second air intake slot; the step supports the cover, and a gap between the first tube section and a top of the cover forms a communication channel communicating the first air intake slot with the second air intake slot; and the airflow channel comprises the first air intake slot, the second air intake slot, and the communication channel.

In an embodiment, a blocking assembly is arranged on one end of the first tube section adjacent to the base for blocking the inner air flowing tube.

In an embodiment, the blocking assembly includes a sealing cover and an electrode located at the center of the sealing cover; and the electrode abuts a positive pole of the base, a positive pole of the atomization assembly is connected to the electrode, and a negative pole of the atomization assembly is connected to a negative pole of the base through the outer air flowing tube and the inner air flowing tube.

The present disclosure further provides an electronic cigarette, including the above atomizer.

Since the engaging portion is located adjacent to the opening of the liquid reservoir of the cartridge which communicates with the external environment and the engaging portion defines the discharging hole, air inside the liquid reservoir can discharge out of the liquid reservoir from the discharging hole when the inserting portion of the mouthpiece assembly is being inserted into the engaging portion, thus, liquid leakage caused by that air inside the liquid reservoir drives the e-liquid to flow into the atomization chamber can be prevented; in addition, after the inserting portion is totally inserted into the engaging portion, the inserting portion blocks the discharging hole, preventing liquid leakage from the discharging hole.

BRIEF DESCRIPTION OF THE DRAWINGS

The present disclosure will be described in more detail with reference to the accompany drawings and the embodiments, wherein in the drawings.

PREFERRED EMBODIMENTS

Figure 1:
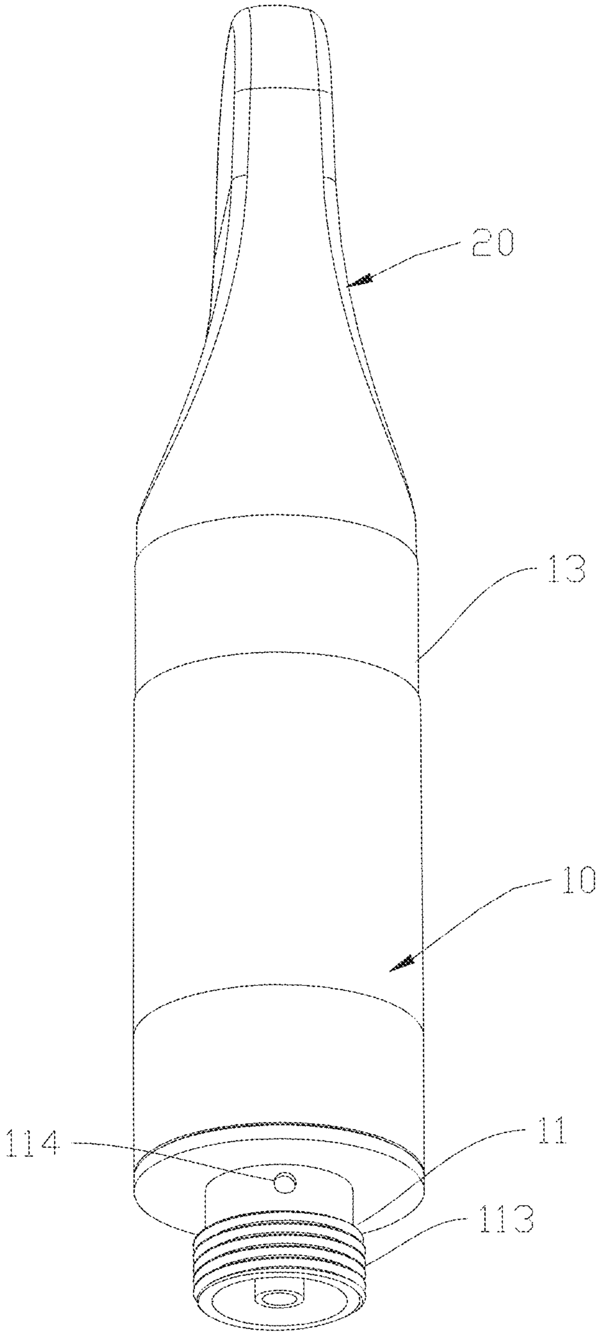
FIG. 1 is a perspective view of an atomizer applicable in an electronic cigarette in accordance with an embodiment of the present disclosure.
Figure 2:
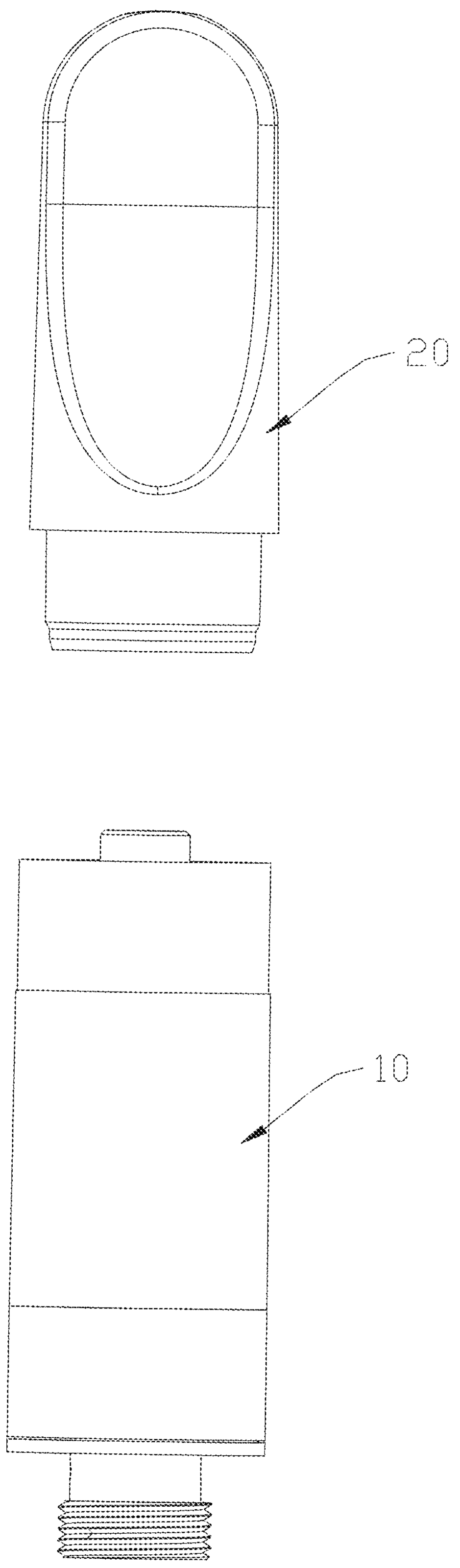
FIG. 2 is a partially exploded view of the atomizer of FIG. 1 in accordance with an embodiment of the present disclosure.
Figure 3:
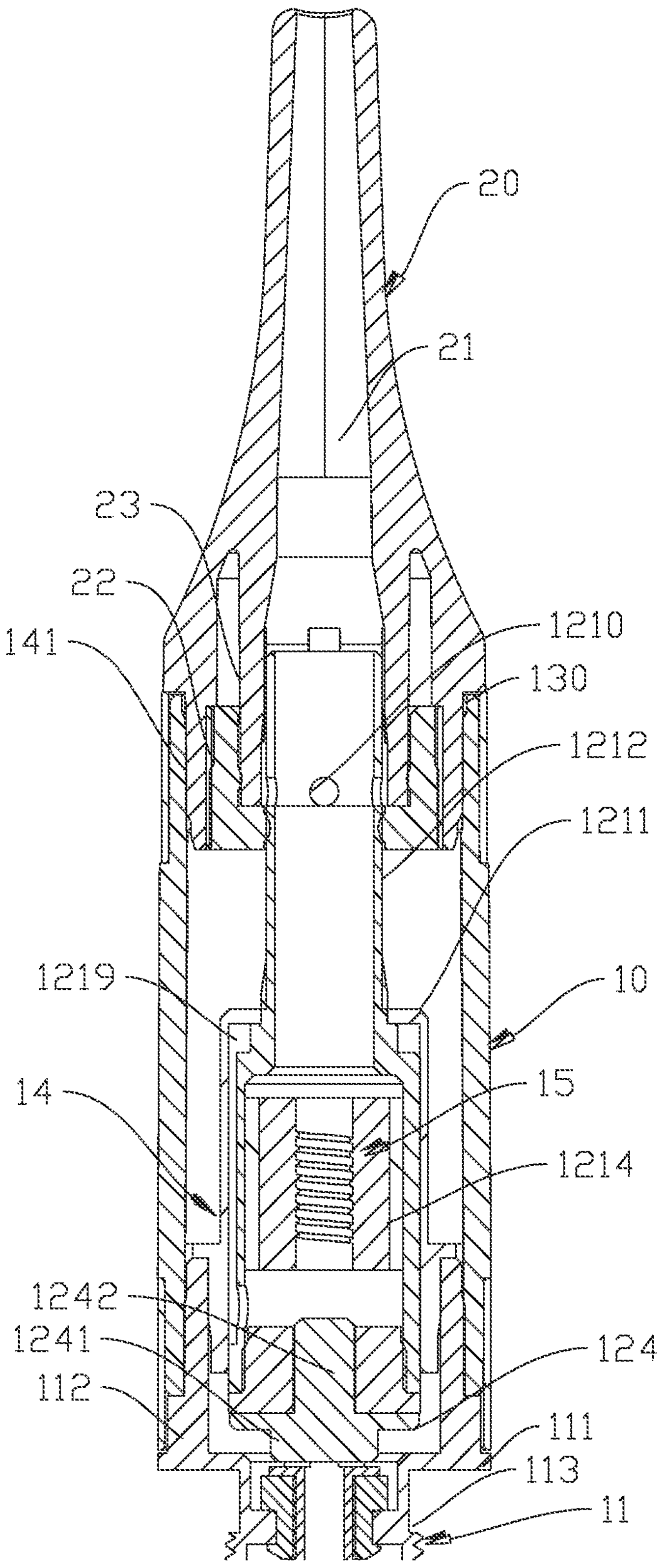
FIG. 3 is a cross-sectional view of the atomizer of FIG. 1 in accordance with an embodiment of the present disclosure.

Referring to FIGS. 1 to 3, an atomizer applicable in an electronic cigarette in accordance with an embodiment is provided. The atomizer is engageable with a power supply to form an electronic cigarette. The atomizer includes a cartridge assembly 10 and a mouthpiece assembly 20. A top of the cartridge assembly 10 forms an opening and the mouthpiece assembly 20 is mounted in the opening of the cartridge assembly 10. The cartridge assembly 10 is used for connecting to the power supply, storing e-liquid, and atomizing the e-liquid. The mouthpiece assembly 20 is used for covering the opening in the cartridge assembly 10 and guiding atomized smoke out.

Figure 4:
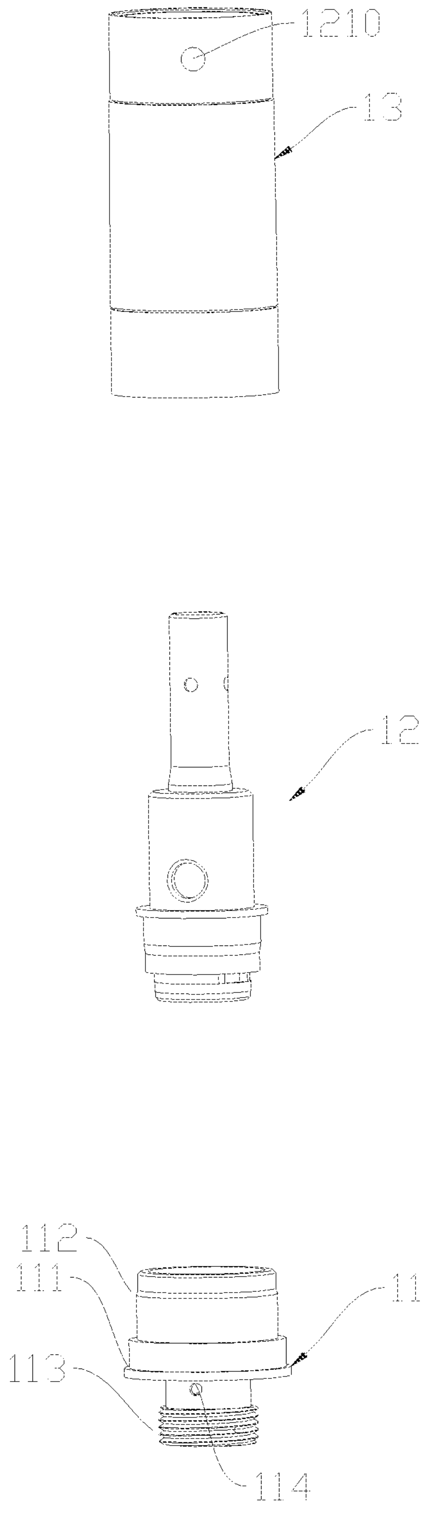
FIG. 4 is an exploded view of a cartridge assembly of the atomizer of FIG. 1 in accordance with an embodiment of the present disclosure.

As shown in FIGS. 3 and 4, the cartridge assembly 10 includes a base 11, an air flowing tube assembly 12 mounted on the base 11, a cartridge 13, and an atomization assembly 15 arranged in the air flowing tube assembly 12. The base 11 is connected to the power supply. The air flowing tube assembly 12 is configured for discharging atomized smoke. The cartridge 13 surrounds the air flowing tube assembly 12, and a liquid reservoir 14 is formed between an inner wall of the cartridge 13 and an outer wall of the air flowing tube assembly 12 for storing e-liquid of the electronic cigarette. The atomization assembly 15 is located in the cartridge 13 for atomizing the e-liquid.

In some embodiments, the air flowing tube assembly 12 and the cartridge 13 are cylindrical, and an outer diameter of the air flowing tube assembly 12 is less than an inner diameter of the cartridge 13. In some embodiments, the air flowing tube assembly 12 is coaxial with the cartridge 13.

The base 11 includes a plate 111, a mounting portion 112 arranged on the plate 111 and extending upwards from the plate 111, and a connecting portion 113 arranged on a bottom of the plate 111. The mounting portion 112 is cylindrical. One side wall of the connecting portion 113 forms a first air inlet 114 for drawing air into the atomizer such that the atomizer can communicate with the external environment. The connecting portion 113 is provided with an electrode. The connecting portion 113 is cylindrical and an outer side of the connecting portion 113 is configured with threads; it is understood that the connecting portion 113 can be threaded to the power supply.

Figure 5:
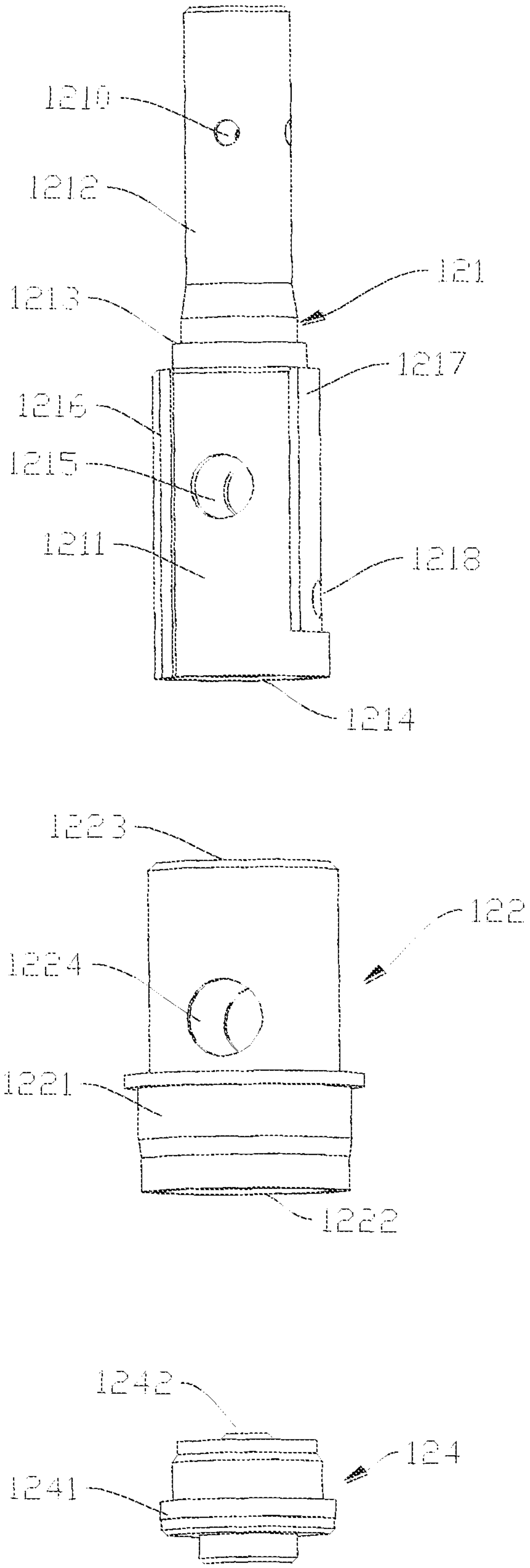
FIG. 5 is an exploded view of an air flowing tube assembly of the atomizer of FIG. 1 in accordance with an embodiment of the present disclosure.
Figure 6:
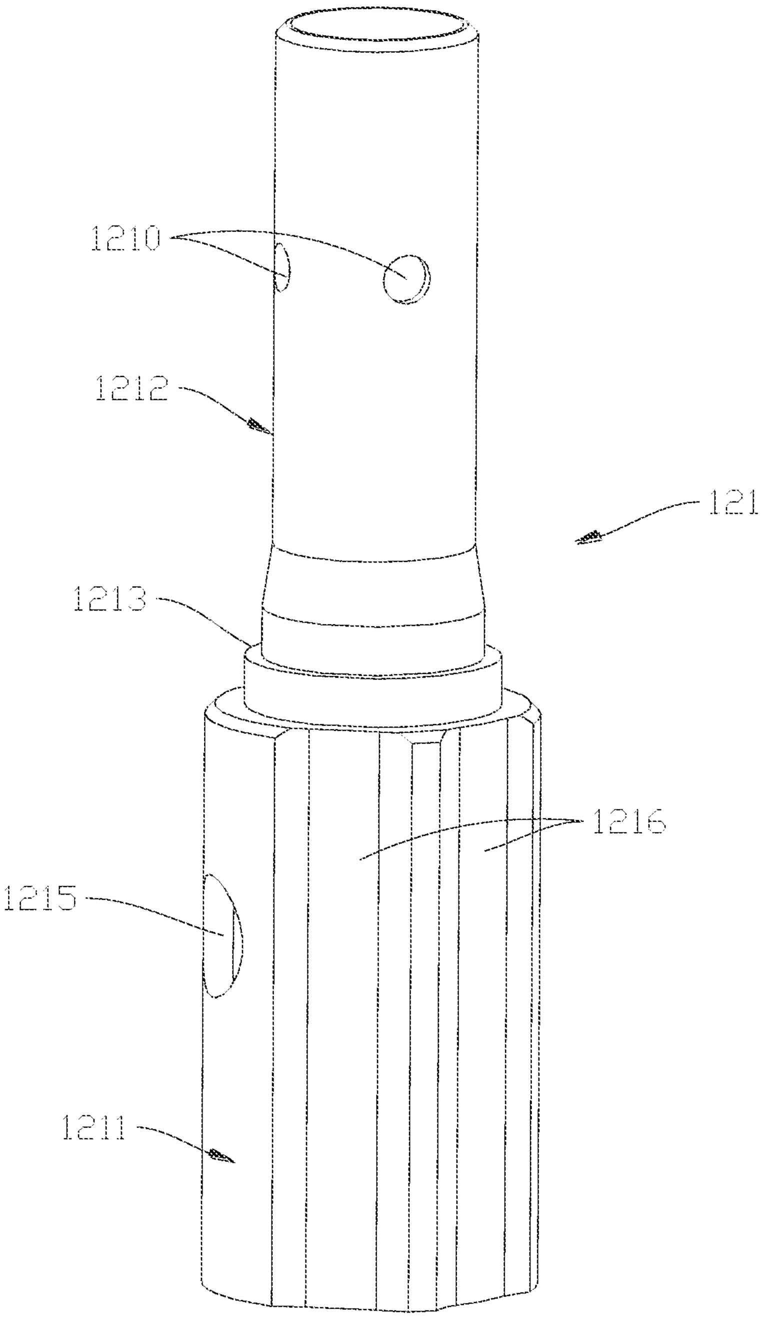
FIG. 6 is a left side view of an inner air flowing tube of the atomizer of FIG. 5 in accordance with an embodiment of the present disclosure.
Figure 7:
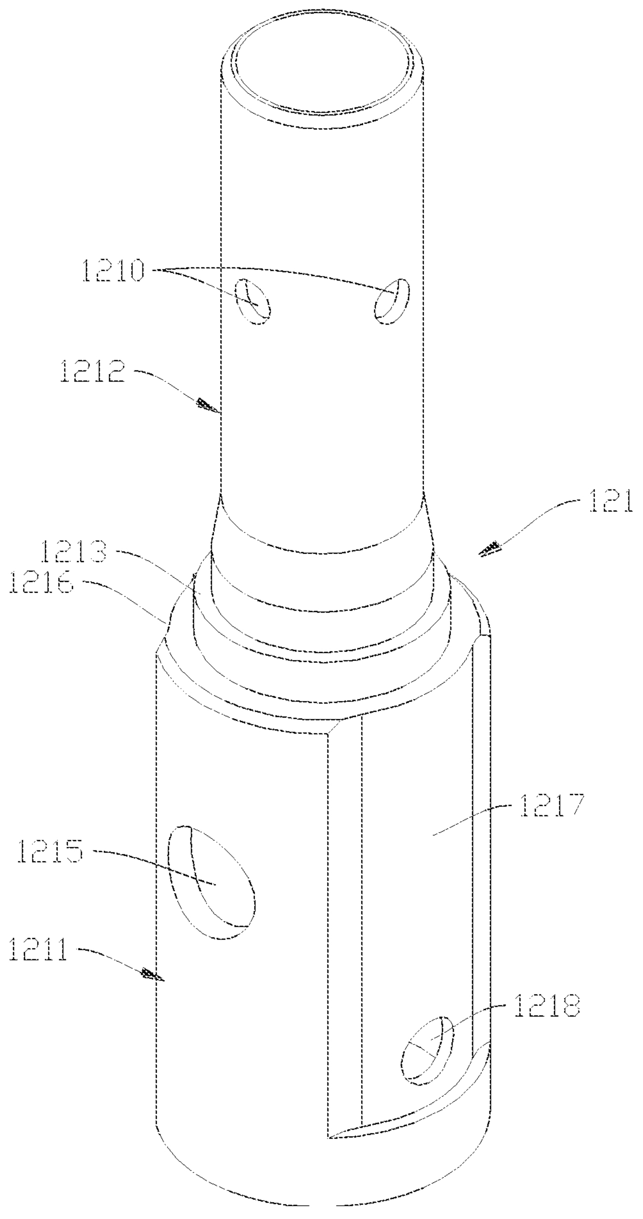
FIG. 7 is a right side view of the inner air flowing tube of atomizer of FIG. 5 in accordance with an embodiment of the present disclosure.
Figure 8:
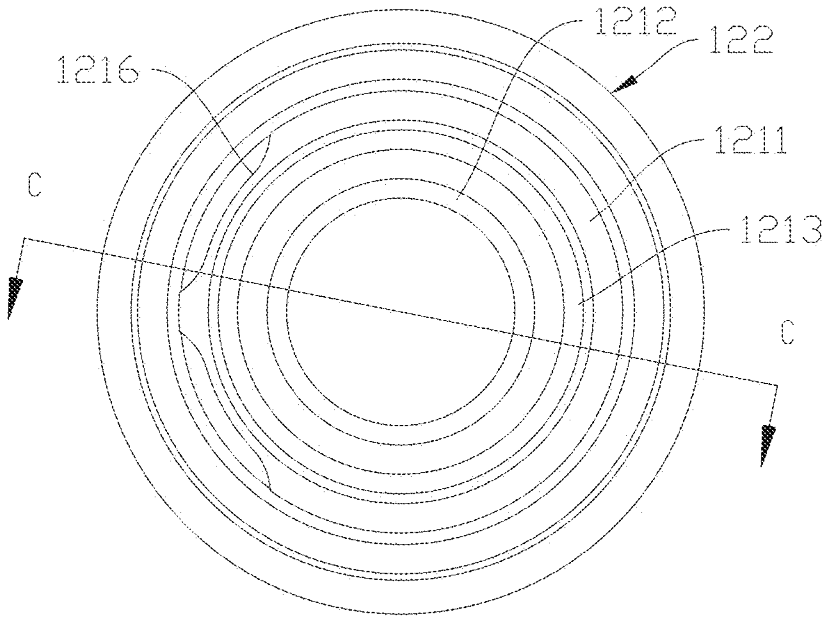
FIG. 8 is a top view of bottoms of the inner air flowing tube and an outer air flowing tube of the atomizer of FIG. 5 in accordance with an embodiment of the present disclosure.

As shown in FIGS. 3 and 5, in an embodiment, the air flowing tube assembly 12 is mounted in the mounting portion 112 of the base 11, including an inner air flowing tube 121, an outer air flowing tube 122 sleeved on the inner air flowing tube 121, and a blocking assembly 124 for blocking the inner air flowing tube 121. The inner air flowing tube 121 is configured for forming an atomization chamber 1214 for receiving the atomization assembly 15 and a channel for guiding smoke out. The outer air flowing tube 122 is configured for cooperating with the inner air flowing tube 121 to form an airflow channel 123 which extends towards a top of the atomizer for a certain distance from a bottom of the atomizer and then extends downwards from the top of the atomizer for a certain distance. The inner air flowing tube 121 and the outer air flowing tube 122 can be made of plastic, rubber, or alloy, etc.

In an embodiment, the inner air flowing tube 121 includes a first tube section 1211 and a second tube section 1212. A diameter of the first tube section 1211 is greater than that of the second tube section 1212. A step is formed at the connection between the first tube section 1211 and the second tube section 1212 for improving a tightness between the outer air flowing tube 122 and the inner air flowing tube 121. The atomization chamber 1214 receiving the atomization assembly 15 is formed in the first tube section 1211. The second tube section 1212 is configured for communicating with the mouthpiece assembly 20 to discharge the atomized smoke.

The first tube section 1211 includes two first liquid absorbing holes 1215 defined in two sides of the first tube section 1211, a first air intake slot 1216 formed in a surface of the first tube section 1211, a second air intake slot 1217 formed in the surface of the first tube section 1211 and facing away from the first air intake slot 1216, and a second air inlet 1218 formed in the second air intake slot 1217. The first liquid absorbing hole 1215 communicates with the liquid reservoir 14 for absorbing e-liquid entering into the atomization chamber 1214. The first air intake slot 1216 extends towards a top of the first tube section 1211 from a bottom of the first tube section 1211 and communicates with the first air inlet 114. The second air intake slot 1217 extends towards the second air inlet 1218 from the top of the first tube section 1211 for guiding air into the second air inlet 1218 such that air can be guided into the atomization chamber 1214.

Figure 9:
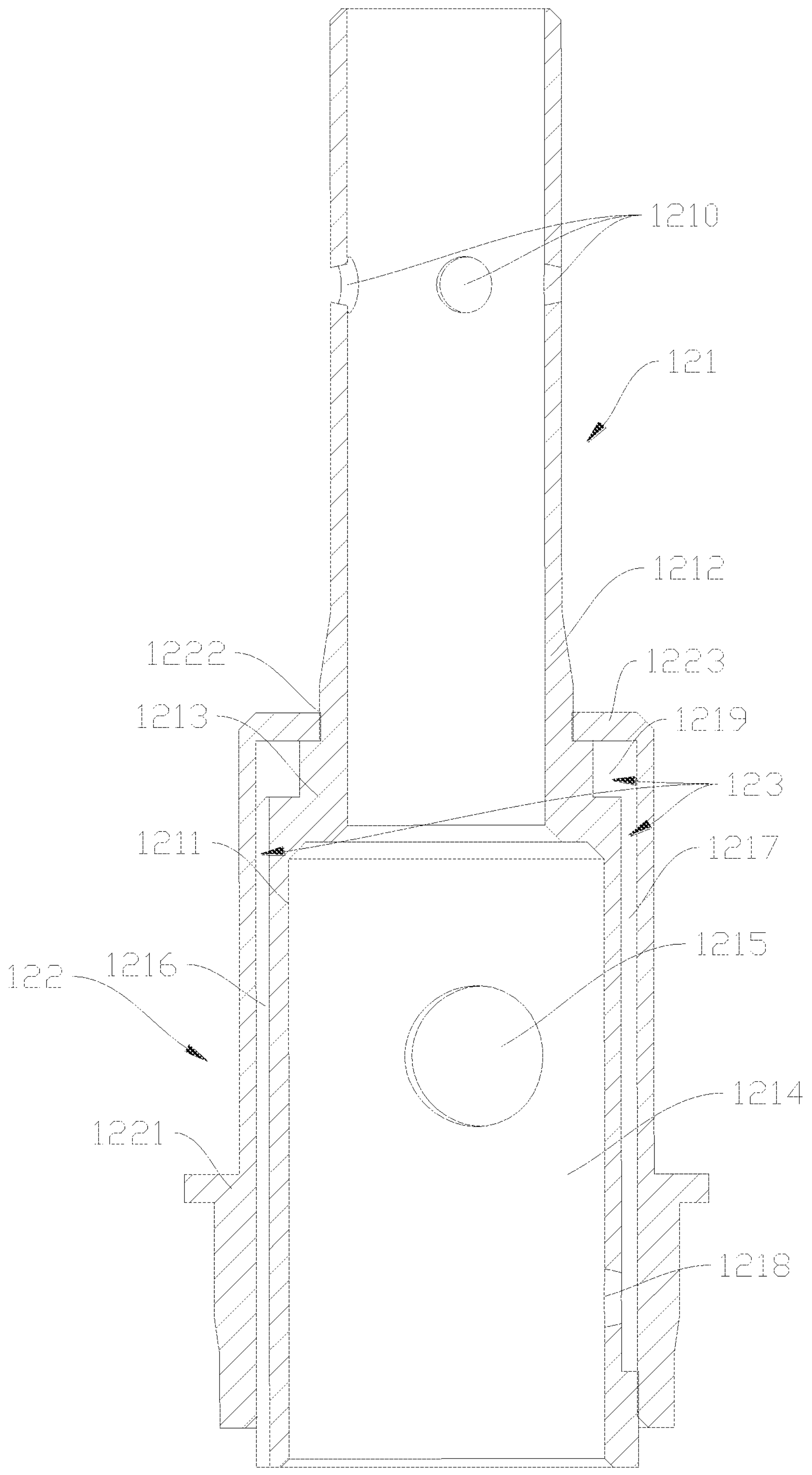
FIG. 9 is a cross-sectional view of the inner air flowing tube and the outer air flowing tube of FIG. 8 taken along the line C-C in accordance with an embodiment of the present disclosure.

As shown in FIGS. 5 and 9, the outer air flowing tube 122 includes a tube body 1221, a cover 1223 located on one end of the tube body 1221, a through hole 1222 defined in the cover 1223, two second liquid absorbing holes 1224 defined in two sides of the tube body 1221. The outer air flowing tube 122 is sleeved on the first tube section 1221, and a length of the outer air flowing tube 122 is greater than that of the first tube section 1211. A bottom diameter of the tube body 1221 matches with that of the first tube section 1211, and a top diameter of the tube body 1221 matches with that of the second tube section 1212. A communication channel 1219 is formed between a top of the tube body 1221 and the top of the first tube section 1211 for guiding air into the second air intake slot 1217 from the first air intake slot 1216. The cover 1223 covers the communication channel 1219 to prevent air discharge from a top of the second tube section 1212. The second liquid absorbing holes 1224 correspond to the first liquid absorbing holes 1215 defined in the first tube section 1211 and communicate with the first liquid absorbing holes 1215 respectively.

Referring to FIGS. 5 to 9, the airflow channel 123 between the inner air flowing tube 121 and the outer air flowing tube 122 communicates with the first air inlet 114 and the second air inlet 1218. The airflow channel 123 extends towards the top of the atomizer for a certain distance to be higher than the second air inlet 1218 and extends downwards from the top of the atomizer to communicate with the second air inlet 1218. In some embodiments, the airflow channel 123 is formed between the outer air flowing tube 121 and the first tube section 1221. The airflow channel 123 includes a first airflow channel extending upwards, a second airflow channel communicating with the second air inlet 1218 such that air can flow downwards, and a communication channel communicating the first airflow channel with the second airflow channel. The first airflow channel can be the first air intake slot 1216 formed in the surface of the first tube section 1211 which includes two parallel air intake sub-slots. The second airflow channel can be the second air intake slot 1217 formed in the surface of the first tube section 1211 and facing away from the first air intake slot 1216. The communication channel can be the communication channel 1219 communicating with the first air intake slot 1216 and the second air intake slot 1217. The communication channel 1219 is the gap formed between the first tube section 1211 and the cover 1223 by the step 1213. With the airflow channel 123, leakage of the e-liquid in the atomizer from the first air inlet 114 can be prevented no matter how the atomizer is placed.

It is understood that in other embodiments, the first air intake slot 1216 and the second air intake slot 1217 can be formed in an inner surface of the outer air flowing tube 122 and correspond to two sides of the inner air flowing tube 121 respectively; or, the airflow channel 123 can be an independent airflow tube arranged between the outer air flowing tube 122 and the inner air flowing tube 121, and a section of the airflow tube extends towards the bottom of the atomizer and is higher than the second air inlet 1218.

As shown FIG. 5, the blocking assembly 124 includes a sealing cover 1241 and an electrode 1242 located at the center of the sealing cover 1241. The sealing cover 1241 is configured for blocking the first tube section 1211. The electrode 1242 abuts a positive pole of the base 11, and one end of the electrode 1242 is connected to a positive pole of the atomization assembly 15, thus, electricity can be conducted to supply power to the atomization assembly 15 for atomization.

Referring to FIG. 3 again, the cartridge 13 is cylindrical for cooperating with the outer wall of the outer air flowing tube 122 to form the liquid reservoir 14. The cartridge 13 can be made of zinc alloy, aluminum alloy, stainless steel or other metal alloys. It is understood that in other embodiments, the cartridge 13 can have other shapes and can be made of plastic having a good heat resistance rather than alloy.

The cartridge 13 further forms an opening 130 communicating the liquid reservoir 14 with the external environment and an engaging portion 141 arranged adjacent to the opening 130. E-liquid can be injected to the atomizer through the opening 130. The engaging portion 141 is configured for connecting to the mouthpiece assembly 20. Two discharging holes 1210 are defined in two sides of the engaging portion 141 for holding the mouthpiece assembly 20. In other embodiments, the discharging holes 1210 can be defined in the second tube section 1212. Air discharges from the liquid reservoir 14 while an inserting portion 22 is being inserted into the engaging portion 141; after the inserting portion 22 has been inserted into the engaging portion 141 in place, the discharging hole 1210 is blocked by the inserting portion 22, thus, e-liquid in the liquid reservoir 14 can be prevented from being pushed to flow into the atomization chamber 15 and thus liquid leakage can be prevented.

Figure 10:
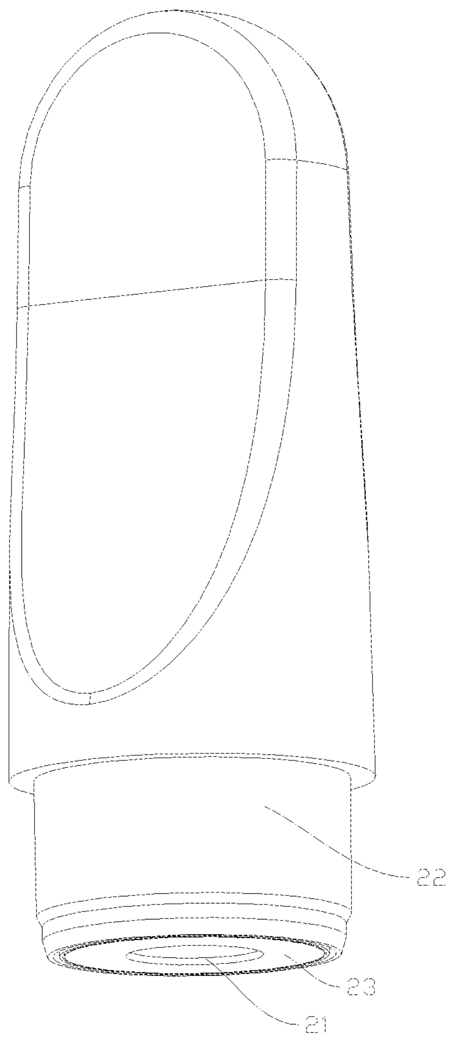
FIG. 10 is a schematic view of a mouthpiece assembly of the atomizer of FIG. 1 in accordance with an embodiment of the present disclosure.

Referring to FIGS. 3 and 10, in some embodiments, the mouthpiece assembly 20 can be located on one end of the cartridge assembly 10 which is away from the base 11. The mouthpiece assembly 20 includes an air outlet tube 21, the inserting portion 22, and a sealing member 23. The air outlet tube 21 communicates with the inner air flowing tube 121 for discharging atomized smoke. The inserting portion 22 is capable being inserted into the engaging portion of the liquid reservoir 14 for blocking the opening of the liquid reservoir 14. The sealing member 23 is configured for blocking the corresponding discharging hole 1210. The sealing member 23 is sleeved into the inserting portion 22 for blocking the corresponding discharging hole 1210 defined in the inner air flowing tube 121. It is understood that the sealing member 23 can be sleeved on the inserting portion 22 for blocking the corresponding discharging hole 1210 defined in the cartridge 13. In order to facilitate the disassembly of the mouthpiece assembly 20 and the injection of the e-liquid, the mouthpiece assembly 20 can be detachably connected to the opening of the liquid reservoir 14, for example, the mouthpiece assembly 20 can be threaded to or clamped onto the opening of the liquid reservoir 14.

The present disclosure further provides an electronic cigarette with the above atomizer. It is understood that a power supply can be arranged on the base 11 of the above atomizer to form the electronic cigarette of the present disclosure.

The contents described above are only preferred embodiments of the present disclosure, but the scope of the present disclosure is not limited to the embodiments. Any ordinarily skilled in the art would make any modifications or replacements to the embodiments in the scope of the present disclosure, and these modifications or replacements should be included in the scope of the present disclosure. Thus, the scope of the present disclosure should be subjected to the claims.

What is claimed is:

1. An atomizer, comprising a cartridge (13) defining a liquid reservoir (14) therein, an air flowing tube assembly (12) disposed in the cartridge (13), and the air flowing tube assembly (12) comprises a discharging hole (1210) communicated with the liquid reservoir (14) and configured for discharging air from inside the liquid reservoir (14);
  - wherein the liquid reservoir (14) is defined between an outer wall of the air flowing tube assembly (12) and an inner wall of the cartridge (13);
  - wherein air flowing tube assembly (12) comprises a first tube section (1211), and a second tube section (1212), the discharging hole (1210) is in the second tube section (1212).

2. The atomizer of claim 1, further comprises a mouthpiece assembly (20);
  - wherein the mouthpiece assembly (20) comprises an inserting portion (22) used for inserting between the air flowing tube assembly (12) and the cartridge (13);
  - wherein the air from the liquid reservoir (14) is discharged while the inserting portion (22) is being inserted between the air flowing tube assembly (12) and the cartridge (13) to close an end of the liquid reservoir (14), and when the inserting portion (22) is inserted in place, the discharging hole (1210) is blocked;
  - wherein the inserting portion (22) is detachably inserted between the air flowing tube assembly (12) and the cartridge (13).

3. The atomizer of claim 2, wherein the second tube section (1212) is in communication with the mouthpiece assembly (20).

4. The atomizer of claim 3, wherein the mouthpiece assembly (20) further comprises a sealing member (23) inserted into the inserting portion (22) for blocking the discharging hole (1210).

5. The atomizer of claim 4, wherein the second tube section (1212) is inserted into the inserting portion (22), and the sealing member (23) is sleeved outside the second tube section (1212) where the discharging hole (1210) is located.

6. The atomizer of claim 2, wherein the atomizer further comprises a sealing member (23) inserted into the inserting portion (22) for blocking the discharging hole (1210).

7. The atomizer of claim 2, wherein the discharging hole (1210) is defined as a hole through a side of a section of the air flowing tube assembly (12) adjacent to the mouthpiece assembly (20).

8. An electronic cigarette comprising an atomizer, the atomizer comprising a cartridge (13) defining a liquid reservoir (14) therein, an air flowing tube assembly (12) disposed in the cartridge (13); the air flowing tube assembly (12) comprises a discharging hole (1210) communicated with the liquid reservoir (14) and configured for discharging air from inside the liquid reservoir (14);
  - wherein the liquid reservoir (14) is defined between an outer wall of the air flowing tube assembly (12) and an inner wall of the cartridge (13);
  - wherein the air flowing tube assembly (12) comprises a first tube section (1211) and a second tube section (1212), the discharging hole (1210) is comprised in the second tube section (1212).

9. The electronic cigarette of claim 8, further comprises a mouthpiece assembly (20) comprising an inserting portion (22) used for inserting between the air flowing tube assembly (12) and the cartridge (13);
  - wherein the air from the liquid reservoir (14) is discharged while the inserting portion (22) is being inserted between the air flowing tube assembly (12) and the cartridge (13) to close an end of the liquid reservoir (14), and when the inserting portion (22) is inserted in place, the discharging hole (1210) is blocked;
  - wherein the inserting portion (22) is detachably inserted between the air flowing tube assembly (12) and the cartridge (13).

10. The electronic cigarette of claim 9, wherein the second tube section (1212) communicating with the mouthpiece assembly (20).

11. The electronic cigarette of claim 10, wherein the mouthpiece assembly (20) further comprises a sealing member (23) inserted into the inserting portion (22) for blocking the discharging hole (1210).

12. The electronic cigarette of claim 11, wherein the second tube section (1212) is inserted into the inserting portion (22), and the sealing member (23) is sleeved outside the second tube section (1212) where the discharging hole (1210) is located.

13. The electronic cigarette of claim 9, wherein the atomizer further comprises a sealing member (23) inserted into the inserting portion (22) for blocking the discharging hole (1210).

14. The electronic cigarette of claim 9, wherein the discharging hole (1210) is defined as a hole through a side of a section of the air flowing tube assembly (12) adjacent to the mouthpiece assembly (20).

15. An atomizer, comprising
  - a cartridge assembly (10),
  - the cartridge assembly (10) comprising:
  - a liquid reservoir (14),
  - an opening (130) communicating the liquid reservoir (14) with an external environment, and
  - an atomization chamber (1214) communicating with the liquid reservoir (14);
  - wherein the cartridge assembly (10) comprises an engaging portion (141) located in the opening (130) and the engaging portion (141) comprises a discharging hole (1210) for discharging air from inside the liquid reservoir (14).

16. The atomizer of claim 15, wherein the atomizer further comprises a mouthpiece assembly (20) being insertable into the opening (130); and the cartridge assembly (10) comprises an air flowing tube assembly (12) and a cartridge (13) sleeved outside the air flowing tube assembly (12); the engaging portion (141) is defined between a section of the air flowing tube assembly (12) adjacent to the mouthpiece assembly (20) and a section of the cartridge (13) adjacent to the mouthpiece assembly (20), and the liquid reservoir (14) is defined between an outer wall of the air flowing tube assembly (12) and an inner wall of the cartridge (13).

17. The atomizer of claim 15, wherein the atomizer further comprises a mouthpiece assembly (20) being insertable into the opening (130), and the mouthpiece assembly (20) comprises an inserting portion (22) inserted into the engaging portion (141); and the atomizer further comprises a sealing member (23) inserted into the inserting portion (22) for blocking the discharging hole (1210).

* * * * *